United States Patent Office 3,068,247
Patented Dec. 11, 1962

3,068,247
PROCESS OF PREPARING 4-HYDROXY-3-
KETO-Δ⁴-STEROIDS
Bruno Camerino, Bianca Patelli, and Roberto Sciaky, all of Milan, Italy, assignors to Societa Farmaceutici Italia, Milan, Italy, a corporation of Italy
No Drawing. Filed Jan. 29, 1962, Ser. No. 169,628
Claims priority, application Italy Feb. 10, 1961
13 Claims. (Cl. 260—397.4)

Our invention relates to a new process of obtaining 4-hydroxy-3-keto-Δ⁴-steroids, of the series of androstane, of 19-nor-androstane and of 17α-hydroxy-pregnane.

Our invention has as an object, the transformation of 4-chloro-3-keto-Δ⁴-steroids to 4-hydroxy-3-keto-Δ⁴-steroids by reaction either with oxygen or air in the presence of the potassium salt of a tertiary aliphatic alcohol. In the U.S. patent application Serial No. 129,478, filed August 4, 1961, a process was described and claimed for obtaining 4-hydroxy-3-keto-Δ⁴-steroids (C), of the normal series and of the 19-nor-series from the corresponding 3-keto-5β-steroids (B) by reaction with oxygen in the presence of the potassium salt of a tertiary aliphatic alcohol. The 3-keto-5β-steroids are obtained by catalytic hydrogenation of the corresponding 3-keto-Δ⁴-steroids (A).

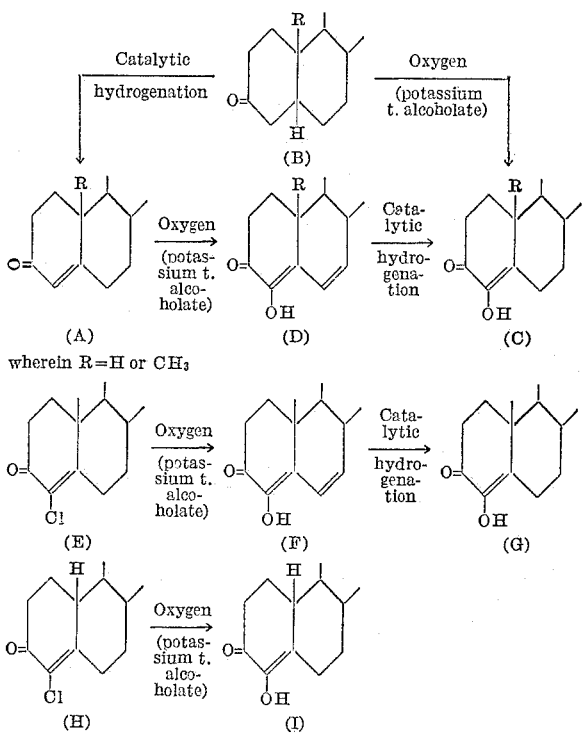

wherein R=H or CH₃

In the U.S. patent application Serial No. 129,255, filed on August 4, 1961, a process was described and claimed in which 3-keto-Δ⁴-steroids of (A) of the normal series and of the 19-nor-series were treated with oxygen, in the presence of the potassium salt of a tertiary aliphatic alcohol to produce the corresponding 4-hydroxy-3-keto-Δ⁴,⁶-steroids (D) which in turn, by catalytic hydrogenation of Δ⁶, yield the corresponding 4-hydroxy-3-keto-Δ⁴-steroids (C).

We have found, and this is the object of the present invention, that 4-halo-3-keto-Δ⁴-steroids by a similar treatment in a tertiary aliphatic alcoholic solution with oxygen in the presence of an alkali metal salt of a tertiary aliphatic alcohol at from 10° to 50° C. can be converted into the corresponding 4-hydroxy-3-keto-Δ⁴,⁶-steroids. The steroids treated are preferably 4-chloro-steroids of the androstane, 19-nor-androstane, and 17α-hydroxy-pregnane series. Those of the normal series yield 4-hydroxy-3-keto-Δ⁴,⁶-steroids from which the corresponding 4-hydroxy-3-keto-Δ⁴-steroid is obtained by catalytic hydrogenation while those of the 19-nor-series yield the corresponding 4-hydroxy-3-keto-Δ⁴-steroids directly.

According to our invention, 4-chloro-3-keto-Δ⁴-steroids (prepared according to B. Camerino et al., Belgian patent applications No. 549,701, No. 552,152, No. 552,153 and No. 557,735), of the series of androstane, 19-nor-androstane and 17α-hydroxy-pregnane, are dissolved in tertiary aliphatic alcohols, such as tertiary buty alcohol or tertiary amyl alcohol, and reacted either with oxygen or air in the presence of the potassium salt of a tertiary aliphatic alcohol, such as potassium, t.butylate or potassium t.amylate. The reaction is carried out at a temperature ranging from 10° to 50° C., preferably at room temperature over a period of time from a few hours to several days. When the treatment is over, the reaction mixture is neutralized with acids, such as acetic acid or a dilute inorganic acid, and then diluted with water. The steroid is extracted with a usual water-immiscible organic solvent.

The resulting crude products, i.e. 4-hydroxy-3-keto-Δ⁴,⁶-steroids of the normal series and 4-hydroxy-3-keto-Δ⁴-steroids of the 19-nor-series may be purified either by crystallization from an organic solvent or by chromatography on resins such as Florisil (an activated magnesium silicate) and subsequent elution and crystallization. They may be transformed into their acylates by acylation of the present primary and secondary hydroxy groups with the chloride or anhydride of an organic acid in the optional presence of a tertiary amine.

The process of our invention may be carried out either with atmospheric oxygen or with pure oxygen. Air or oxygen may be either blown into the solution, in which case it is preferred to remove any carbon dioxide and moisture present, or reaction may be carried out at the surface of the steroid solution standing in large and open containers. The molar ratio of potassium t.alcoholate and steroid may range from 1:1 to 1:30 and is preferably between 1:5 and 1:10.

The transformation of 4-hydroxy-3-keto-Δ⁴,⁶-steroids of the normal series into the corresponding 4-hydroxy-3-keto-Δ⁴-steroids is carried out by hydrogenation in the presence of catalysts, such as 5–10% palladium on charcoal or platinum dioxide until one mol of hydrogen is absorbed at room temperature and atmospheric pressure, said 4-hydroxy-3-keto-Δ⁴-steroids being thereafter purified according to the usual procedures.

4-hydroxy-3-keto-Δ⁴-steriods are useful in therapy in particular as anabolic, androgenic and progestative products as disclosed in Belgian Patents No. 588,348, No. 579,383, No. 588,005, No. 588,006 and U.S. patent application Serial No. 79,960, filed January 3, 1961.

The following examples serve to illustrate, but are not intended to limit, the present invention.

EXAMPLE 1

4-Hydroxy-Testosterone 2 g. of 4-chloro-testosterone-acetate were dissolved in 80 cc. of t.butanol. A potassium t.butylate solution, prepared from 0.90 g. of potassium and 30 cc. of t.butanol, was added thereto. The reaction was allowed to proceed at room temperature and the course thereof was followed by U.V. spectroscopic examination. After about 18 hours, the maximum at 256 mμ had completely disappeared and a new maximum appeared at 300–305 mμ. The solution was neutralized with acetic acid, diluted with ethyl acetate, and then poured into salty water. The organic extract was washed with a 5% solution of sodium bicarbonate and then with water to neutrality. The extract was dried over Na$_2$SO$_4$ and evaporated to dryness under vacuum. The crude product absorbed U.V. radiation at 318 m$\mu$ and gave a violet coloration with ferric chloride. The residue was dissolved in benzene and chromatographed on Florisil. The fractions, after being eluted with benzene-ether 9:1 and 8:2 by volume mixtures, were recrystallized from ether. A halogen-free product was obtained which melted at 210–215° C. with $\lambda$ max. 318 m$\mu$, which is identical to 4-hydroxy-$\Delta^6$-dehydro-testosterone in every respect.

Acetylation of 4-hydroxy-$\Delta^6$-dehydro-testosterone with acetic anhydride and pyridine yielded the corresponding 4,17-diacetate (M.P. 150–153° C.). Hydrogenation of 4-hydroxy-$\Delta^6$-dehydro-testosterone in the presence of palladium on charcoal or platinum dioxide PtO$_2$), yielded 4-hydroxy-testosterone (M.P. 221–223° C.).

EXAMPLE 2

*4-Hydroxy-17$\alpha$-Methyltestosterone*

2 g. of 4-chloro-17$\alpha$-methyltestosterone were dissolved in 80 cc. of t.butanol. A potassium t-butylate solution prepared from 0.90 g. of K and 30 cc. of t.butanol was added thereto. The reaction was allowed to proceed at room temperature and its course was followed by U.V. spectroscopic examination. After about 18 hours, the maximum at 256 m$\mu$ had completely disappeared and a new maximum appeared at 300–305 m$\mu$. The solution was neutralized with acetic acid, diluted with ethyl acetate, and then poured in salty water. The organic extract was washed with a 5% solution of NaHCO$_3$ and then with water to neutrality. The extract was then dried over Na$_2$SO$_4$ and evaporated to dryness under vacuum. The crude product absorbed U.V. radiation at 318 m$\mu$ and gave a violet coloration with ferric chloride. The residue was dissolved in benzene and chromatographed on Florisil. The fractions, after being eluted with benzene-ether 9:1 volume mixture, were recrystallized from ether. A halogen-free product was thereby obtained, which melted at 195–205° C. with $\lambda$ max. 318 m$\mu$, which is identical to 4-hydroxy-$\Delta^6$-dehydro-17$\alpha$-methyltestosterone in every respect.

Hydrogenation of 4-hydroxy-$\Delta^6$-dehydro-17$\alpha$-methyltestosterone in the presence of palladium on charcoal or platinum dioxide (PtO$_2$) yielded 4-hydroxy-17$\alpha$-methyltestosterone (M.P. 170–172° C.).

EXAMPLE 3

*4,17$\alpha$-Dihydroxy-Progesterone*

0.5 g. of 4-chloro-4-pregnen-17$\alpha$-ol-3,20-dione (melting at 223–225° C.) were dissolved in 20 cc. of t.butanol, then warmed to 35° C. and reacted with 0.35 g. of potassium dissolved in 10 cc. of t.butanol in an oxygen stream for 40 minutes. The solution was acidified with acetic acid, diluted with water and extracted with ethyl acetate. The extract was washed wih a 10% solution of sodium bicarbonate and with water. After distillation of the solvent, a residue remained which had $\lambda$ max. 318 m$\mu$ and, crystallized from aqueous methanol, yielded 4,6-pregnadiene-4,17$\alpha$-diol-3,20-dione melting at 260–262° C. The above-mentioned product was transformed into 4,17$\alpha$-dihydroxy-progesterone (M.P. 229–231° C.) by hydrogenation in the presence of palladium on charcoal or platinum dioxide.

EXAMPLE 4

*4-Hydroxy-19-Nor-Testosterone*

1.5 g. of 4-chloro-19-nor-testosterone acetate were dissolved in 60 cc. of t.butanol, and a solution of potassium t.butylate, prepared from 0.67 g. of potassium and 22.5 cc. of t.butanol, was added thereto. The reaction was allowed to proceed at room temperature and the course thereof followed by U.V. spectroscopic examination. After about 5 hours, the maximum at 256 m$\mu$ had disappeared and a new maximum appeared at about 278– 280 m$\mu$. The solution was neutralized with acetic acid, diluted with ethyl acetate, and poured into salty water. The organic extract was washed with a 5% solution of NaHCO$_3$ and then with H$_2$O to neutrality. The extract was then dried over anhydrous Na$_2$SO$_4$ and evaporated to dryness under vacuum. The crude product absorbed U.V. radiation at 278 m$\mu$ and gave a green coloration with ferric chloride. The residue was dissolved in benzene and chromatographed on Florisil. The fractions eluted with benzene-ether 9:1 and 8:2 volume mixtures were rercystallized from ether-petroleum ether. A product was obtained which melts at 185–190° C. with a $\lambda$ max. at 287 m$\mu$ and is identical to 4-hydroxy-19-nor-testosterone in every respect.

EXAMPLE 5

*4-Hydroxy-19-Nor-17$\alpha$-Methyltestosterone*

1.5 g. of 4-chloro-19-nor-17$\alpha$-methyl-testosterone were dissolved in 60 cc. of t.butanol. A solution of potassium t.butylate, prepared from °.67 g. of potassium in 22.5 cc. of t.butanol, was added thereto. The reaction was allowed to proceed at room temperature and the course thereof followed by U.V. spectroscopic examination. After about 3 hours, the maximum at 256 m$\mu$ had disappeared and a new maximum appeared at 278–280 m$\mu$. The solution was neutralized with acetic acid, diluted with ethyl acetate, and then poured into salty water; the extract was washed with a 5% solution of NaHCO$_3$, with H$_2$O to neutrality, dried over Na$_2$SO$_4$ and evaporated to dryness under vacuum. The crude product absorbed U.V. radiation at 278 m$\mu$ and gave a green coloration with ferric chloride. The residue was dissolved in chloroform and passed through a little column of Florisil by elution with chloroform. The eluates were recrystallized from ether-petroleum ether. A crystalline product, melting at 145–155° C., was obtained, with a $\lambda$ max. 278 m$\mu$, which is identical to 4-hydroxy-17$\alpha$-methyl-19-nor-testosterone in every respect.

Obviously many modifications and variations of the present invention are possible in the light of the above teachings. It is therefore to be understood that within the scope of the appended claims, the invention may be practiced otherwise than as specifically described.

We claim:

1. A process of preparing a compound selected from the group consisting of 4-hydroxy-3-keto-$\Delta^4$-steroids of the androstane series, and of the 17$\alpha$-hydroxy-pregnane series, which comprises reacting the corresponding 4-halo-3-keto-$\Delta^4$-steroid with oxygen in a tertiary aliphatic alcohol in the presence of the potassium salt of a tertiary aliphatic alcohol and transforming the resulting 4-hydroxy-3-keto-$\Delta^{4,6}$-steroid by catalytic hydrogenation with a catalyst selected from the group consisting of palladium on charcoal and platinum dioxide to the resulting 4-hydroxy-3-keto-$\Delta^4$-steroid.

2. A process of preparing a compound selected from the group consisting of 4-hydroxy-3-keto-$\Delta^4$-steroids of the androstane series, and of the 17$\alpha$-hydroxy-pregnane series, which comprises reacting the corresponding 4-chloro-3-keto-$\Delta^4$-steroid with oxygen in a tertiary aliphatic alcohol in the presence of the potassium salt of a tertiary aliphatic alcohol and transforming the resulting 4-hydroxy-3-keto-$\Delta^{4,6}$-steroid by catalytic hydrogenation with a catalyst selected from the group consisting of palladium on charcoal and platinum dioxide to the resulting 4-hydroxy-3-keto-$\Delta^4$-steroid.

3. A process of preparing a compound selected from the group consisting of 4-hydroxy-3-keto-$\Delta^4$-steroids of the androstane series, and of the 17$\alpha$-hydroxy-pregnane series, which comprises dissolving the corresponding 4-chloro-3-keto-$\Delta^4$-steroid in a tertiary aliphatic alcohol, reacting the steroid solution with oxygen in the presence of the potassium salt of a tertiary alcohol, in a molar ratio of base to steroid from 1:1 to 1:30, at atmospheric pressure and a temperature between 10 to 50° C., and transforming the resulting 4-hydroxy-3-keto-$\Delta^{4,6}$-steroids by catalytic hydrogenation with a catalyst selected from the group consisting of palladium on charcoal and platinum dioxide to the resulting 4-hydroxy-3-keto-$\Delta^4$-steroids.

4. A process of preparing 4-hydroxy-3-keto-$\Delta^4$-steroids of the series of 19-nor-androstane, which comprises dissolving the corresponding 4-chloro-3-keto-$\Delta^4$-steroid in a tertiary aliphatic alcohol, reacting the steroid solution with oxygen in the presence of the potassium salt of a tertiary alcohol, in a molar ratio of base to steroid from 1:1 to 1:30, at atmospheric pressure and a temperature between 10 to 50° C., to yield the resulting 4-hydroxy-3-keto-$\Delta^4$-steroid.

5. A process of preparing a compound selected from the group consisting of 4-hydroxy-3-keto-$\Delta^4$-steroids of the androstane series and of the 17α-hydroxy-pregnane series, which comprises dissolving the corresponding 4-chloro-3-keto-$\Delta^4$-steroid in a tertiary aliphatic alcohol, selected from the group consisting of tertiary butyl and tertiary butyl alcohol, reacting the steroid solution with oxygen by blowing carbon dioxide-and-moisture-free oxygen in said steroid solution, in the presence of the potassium salt of a tertiary alcohol selected from the group consisting of potassium t.butylate and potassium t.amylate, in a molar ratio of base to steroid from 1:5 to 1:10, at atmospheric pressure and room temperature for about 1 to 2 days, transforming the resulting 4-hydroxy-3-keto-$\Delta^{4,6}$-steroids by catalytic hydrogenation with a catalyst selected from the group consisting of palladium on charcoal and platinum dioxide to the resulting 4-hydroxy-3-keto-$\Delta^4$-steroids.

6. A process of preparing a compound selected from the group consisting of 4-hydroxy-3-keto-$\Delta^4$-steroids of the androstane series and of the 17α-hydroxy pregnane series, which comprises dissolving the corresponding 4-chloro-3-keto-$\Delta^4$-steroid in a tertiary aliphatic alcohol, selected from the group consisting of tertiary butyl and tertiary butyl alcohol, reacting the steroid solution with oxygen in the presence of the potassium salt of a tertiary alcohol selected from the group consisting of potassium t.butylate and potassium t.amylate, in a molar ratio of potassium alcoholate to steroid from 1:5 to 1:10, at atmospheric pressure and room temperature for about 1 to 2 days, transforming the resulting 4-hydroxy-3-keto-$\Delta^{4,6}$-steroids by catalytic hydrogenation with a catalyst selected from the group consisting of palladium on charcoal and platinum dioxide to the resulting 4-hydroxy-3-keto-$\Delta^4$-steroids.

7. A process of preparing 4-hydroxy-3-keto-$\Delta^4$-steroids of the series of 19-nor-androstane, which comprises dissolving the corresponding 4-chloro-3-keto-$\Delta^4$-steroid in a tertiary aliphatic alcohol, selected from the group consisting of tertiary butyl and tertiary butyl alcohol, reacting the steroid solution with oxygen by blowing carbon dioxide-and-moisture-free oxygen in said steroid solution, in the presence of the potassium salt of a tertiary alcohol selected from the group consisting of potassium t.butylate and potassium t-amylate, in a molar ratio of base to steroid from 1:5 to 1:10, at atmospheric pressure and room temperature for about 1 to 2 days, to give the corresponding 4-hydroxy-3-keto-$\Delta^4$-steroids.

8. A process of preparing 4-hydroxy-testosterone, which comprises reacting 4-chloro-testosterone-acetate dissolved in a tertiary aliphatic alcohol, selected from the the group consisting of tertiary butyl and tertiary butyl alcohol, reacting the steroid solution with oxygen in the presence of the potassium salt of a tertiary alcohol selected from the group consisting of potassium t.butylate and potassium t.amylate, in a molar ratio of potassium alcoholate to steroid from 1:5 to 1:10, at atmospheric pressure and room temperature, and transforming the resulting 4-hydroxy-$\Delta^6$-dehydro-testosterone by a catalytic hydrogenation with a catalyst selected from the group consisting of palladium on chracoal and platinum dioxide to 4-hydroxy-testosterone.

9. A process of preparing 4-hydroxy-17α-methyl-testosterone, which comprises reacting 4-chloro-17α-methyl-testosterone dissolved in a tertiary aliphatic alcohol, selected from the group consisting of tertiary butyl and tertiary butyl alcohol, reacting the steroid solution with oxygen in the presence of the potassium salt of a tertiary alcohol selected from the group consisting of potassium t.butylate and potassium t.amylate, in a molar ratio of potassium alcoholate to steroid from 1:5 to 1:10, at atmospheric pressure and room temperature, and catalytically hydrogenating with a catalyst selected from the group consisting of palladium on charcoal and platinum dioxide the resulting 4-hydroxy-$\Delta^6$-dehydro-17α-methyl-testosterone to 4-hydroxy-17α-methyl-testosterone.

10. A process of preparing 4,17α-dihydroxy-progesterone, which comprises reacting 4-chloro-4-pregnen-17α-ol-3,20-dione dissolved in a tertiary aliphatic alcohol, selected from the group consisting of tertiary butyl and tertiary butyl alcohol, reacting the steroid solution with oxygen in the presence of the potassium salt of a tertiary alcohol selected from the group consisting of potassium t.butylate and potassium t.amylate, in a molar ratio of potassium alcoholate to steroid from 1:5 to 1:10, at atmospheric pressure and room temperature, and catalytically hydrogenating with a catalyst selected from the group consisting of palladium on charcoal and platinum dioxide the resulting 4,6-pregnediene-4,17α-diol-3,20-dione to 4,17α-dihydroxyprogesterone.

11. A process of preparing 4-hydroxy-19-nor-testosterone, which comprises reacting 4-chloro-19-nor-testosterone dissolved in a tertiary aliphatic alcohol, selected from the group coonsisting of tertiary butyl and tertiary butyl alcohol, reacting the steroid solution with oxygen in the presence of the potassium salt of a tertiary alcohol selected from the group consisting of potassium t.butylate and potassium t.amylate, in a molar ratio of potassium alcoholate to steroid from 1:5 to 1:10, at atmospheric pressure and room temperature, to yield 4-hydroxy-19-nor-testosterone.

12. A process of preparing 4-hydroxy-19-nor-17α-methyl-testosterone which comprises reacting 4-chloro-19-nor-17α-methyl-testosterone dissolved in a tertiary aliphatic alcohol, selected from the group consisting of tertiary butyl and tertiary butyl alcohol, reacting the steroid solution with oxygen in the presence of the potassium salt of a tertiary alcohol selected from the group consisting of potassium t.butylate and potassium t.amylate, in a molar ratio of potassium alcoholate to steroid from 1:5 to 1:10, at atmospheric pressure and room temperature, to yield 4-hydroxy-19-nor-17α-methyltestosterone.

13. A process of preparing 4,17-diacetate-$\Delta^6$-testosterone, which comprises reacting 4-chloro-testosterone-acetate dissolved in a tertiary aliphatic alcohol, selected from the group consisting of tertiary butyl and tertiary butyl alcohol, reacting the steroid solution with oxygen in the presence of the potassium salt of a tertiary alcohol selected from the group consisting of potassium t.butylate and potassium t.amylate, in a molar ratio of potassium alcoholate to steroid from 1:5 to 1:10, at atmospheric pressure and room temperature, and transforming the resulting 4-hydroxy-$\Delta^6$-dehydro-testosterone by acetylation to 4,17-diacetate-$\Delta^6$-testosterone.

No references cited.